United States Patent Office 3,822,229
Patented July 2, 1974

3,822,229
AQUEOUS BINDER COMPOSITIONS BASED ON CURABLE LIQUID SYNTHETIC RESIN, CURING AGENT THEREFOR, HYDRAULIC CEMENT AND PLASTICIZING AGENT
Elmer L. McMaster, Midland, Mich., assignor to The Dow Chemical Company, Midland, Mich.
No Drawing. Filed Nov. 10, 1972, Ser. No. 305,450
Int. Cl. C08f 45/24
U.S. Cl. 260—29.6 S     14 Claims

ABSTRACT OF THE DISCLOSURE

Plastic, aqueous binder compositions based on an ambient temperature curable liquid synthetic resin and an ambient temperature curing agent therefore, a hydraulic cement and sufficient water to cure the cement, and a plasticizing agent for the composition comprising an aqueous dispersion of (1) a film-forming carboxyl-containing polymer and (2) a six-membered carbocyclic compound having two vicinal carboyl substituents; which dispersions, after being dried, are redispersible in water.

Background of the Invention

Binder or "mortar" compositions of the type contemplated by the present invention, excluding the specific plasticizing agent described herein, are broadly disclosed in U.S. Pat. 3,240,736.

The prior known methods for preparing such compositions comprise preparation of a mixture of (a) cement, plasticizer (i.e., latex) and a separate mixture of (b) resin and curing agent, followed by prompt admixing of the separately formed mixes. Such process requires that the ingredients of the binder composition be supplied to the user as a four-package system, i.e., individual packages of cement, plasticizer, resin and curing agent. Heretofore, these ingredients could not be premixed and stored without adversely affecting the binder properties. It is the primary object of the present invention to provide binder compositions having excellent adhesive properties by a means wherein the ingredients thereof may be premixed and supplied to the user as a two-package system.

Summary of the Invention

The above and related objects are attained using a binder composition comprising a mixture of the following in parts by weight of solids; from about 20 to about 85 hydraulic cement, from about 10 to about 50 liquid synthetic thermosetting ambient temperature curable resin and an ambient temperature curing agent therefor, and from about 2 to about 25 of a polymeric latex plasticizer for the composition comprising an aqueous dispersion of particles of a copolymer of from about 1 percent to about 10 percent of an $\alpha,\beta$-ethylenically unsaturated carboxylic acid and the balance of a polymerizable, essentially water-insoluble, ethylenically unsaturated monomeric composition and an effective amount to provide water redispersibility of a six-membered carbocyclic compound having two vicinal carboxyl substituents; said copolymer being film forming at temperatures below about 95° C.

The invention further encompasses processes for forming such compositions wherein the ingredients may be premixed and supplied to the user as two-package systems without detriment to binder effectiveness. Such processes comprise (a) separately preparing a mixture of a blend of cement, resin and the dried solids of the plasticizing latex and thereafter admixing the same with curing agent and water, or (b) preparing a first mixture comprising a blend of cement, curing agent and dried latex solids and thereafter admixing the same with said resin and water.

Description of the Preferred Embodiments

Typical ambient temperature curable resins, and curing agents therefore, are those as described in U.S. Pat. 3,240,736, issued Mar. 15, 1966, with the epoxy resins and their conventional curing agents being preferred.

The hydraulic cement employed in the present invention can be the conventional hydraulic cements such as Portland cement; La Farge, a grappier derived from hydraulic lime; lime; Roman cement, a cement made by heating clay and limestone; blast furnace slag cement; Keene's cement, which is a form of dehydrated gypsum with small amounts of accelerators such as alum or potassium sulfate added; conventional gypsum; plaster of Paris; calcium aluminate; pozzolana, a natural cement; and the like which when mixed with water, set or cure to form a solid rigid mass. It will be understood that the foregoing do not all act in an identical manner. For example, conventional gypsum sets quite rapidly as compared to Portland cement, and while these two do not per se form solids of the same bond strength, they both produce strong bonds and high strength in the compositions of the present invention. Conventional accelerators and retarding agents for the various cements can also be added.

It will be understood that in each instance where the hydraulic cements are employed in the present invention, sufficient water is added to completely hydrate and cure the cement. Some or all of the necessary water may be derived from some of the other composition components, for example, from the plasticizers when they are employed in the form of aqueous emulsions, i.e., the rubber latices.

Other nonreactive organic and inorganic fillers and modifiers such as asbestos, hollow phenolic spheres known as microballoons, carbon blacks, talcs, calcium carbonates, glass fibers, sand, micas, wood flour, clays, silicas, barytes, aluminum oxides, zinc oxides, lead oxides, titanium dioxides, and liquid-solid dispersions such as asbestos in water, lead oxides in glycerin, silicas in waterglass, barytes in waterglass, calcium carbonates in waterglass, etc., can be added to or used as a partial replacement of the above mentioned hydraulic cements. These modifiers are added to increase bulk, reduce cost, add thixotrophy, or other specific properties. Partial replacement can be made with these modifiers where ultimate strength is not as important as cost, viscosity, thixotropy, bulk, etc. or when the present compositions are used as caulking or sealing materials.

The plasticizing agent for the composition contains a mixture of a film-forming copolymer and a six-membered carbocyclic compound having two vicinal carboxyl substituents and are prepared either by the addition of such a carbocyclic compound to a preformed latex or by the in situ preparation of the carbocyclic compound and the copolymer comprising the latex by an emulsion polymerization process. For brevity, the methods are sometimes referred to hereinafter as the "additive method" when the carbocyclic compound per se is added either before, during, or after polymerizing the monomeric components of the latex and as the "in situ method" when the carbocyclic compound is formed during emulsion polymerization.

The six-membered carbocyclic compounds having two vicinal carboxyl substituents, i.e., compounds containing a ring composed of six carbon atoms having one carboxyl group attached to each of two adjacent ring-carbon atoms, are represented by phthalic acid, 1,2,3,6-tetrahydrophthalic acid and hexahydrophthalic acid. These compounds are phthalic acid and phthalic acid derivatives having different degrees of saturation; e.g., phthalic acid is completely unsaturated, hexahydrophthalic acid is completely saturated whereas 1,2,3,6-tetrahydrophthalic acid has an intermediate degree of saturation. The term "six-membered" refers only to the number of carbon atoms in the carbocyclic ring.

In the additive method of preparation wherein the carbocyclic compound, as heretofore defined, is mixed with a preformed latex, there are many known latexes which are suitable in the practice of the invention. It is required that such latexes contain a copolymer of from about 1 percent to about 10 percent of an $\alpha,\beta$-ethylenically unsaturated carboxylic acid and a substantially water-insoluble ethylenically unsaturated monomeric composition wherein the copolymer is film forming at temperatures below about 95° C., preferably below about 30° C. and has a particle size within the range of from about 500 Angstroms to about 10,000 Angstroms.

The $\alpha,\beta$-ethylenically unsaturated carboxylic acids may be monocarboxylic or polycarboxylic and ordinarily have from 3 to 6 carbon atoms although acids having a greater number of carbon atoms such as up to 10 may be used. Representative of the unsaturated monocarboxylic acids are acrylic acid, methacrylic acid, ethacrylic acid, crotonic acid, sorbic acid, hydrosorbic acid, and cinnamic acid. Representative of unsaturated polycarboxylic acids are maleic acid, fumaric acid, itaconic acid, citraconic acid, mesaconic acid and aconitic acid.

The ethylenically unsaturated monomeric composition which is copolymerized with such unsaturated acids in the preformed latexes includes one or more monoethylenically unsaturated, copolymerizable monomers which form hydrophobic polymers and/or an aliphatic conjugated diene.

The copolymerizable, ethylenically unsaturated compounds which as homopolymers or as copolymers with each other are hydrophobic are represented by, but not restricted to, nonionic monoethylenically unsaturated monomers such as the alkenyl aromatic compounds, i.e., the styrene compounds, the derivatives of $\alpha$-methylene monocarboxylic acids such as the acrylic esters, acrylic nitriles and methacrylic esters; derivatives of $\alpha,\beta$-ethylenically unsaturated dicarboxylic acids such as maleic diesters; unsaturated alcohol esters, unsaturated ketones; unsaturated ethers; and other polymerizable vinylidene compounds such as vinyl chloride vinylidene chloride. Specific examples of such ethylenically unsaturated compounds are styrene, $\alpha$-methylstyrene, ar-methylstyrene, ar-ethylstyrene, $\alpha$,ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl $\alpha$-chloroacrylate, diethyl maleate, dimethyl fumarate, diethyl itaconate, vinyl acetate, vinyl propionate, vinyl chloride, vinyl bromide, vinylidene chloride, vinylidene fluoride, vinyl methyl ketone, methyl isopropenyl ketone, and vinyl ethyl ether.

By the term, aliphatic conjugated diene, it is meant to include, typically, 1,3-butadiene, 2-methyl-1,3-butadiene, 2,3-dimethyl-1,3-butadiene, piperylene, 2-neopentyl-1,3-butadiene, and other hydrocarbon homologs of 1,3-butadiene, and, in addition, the substituted dienes, such as 2-chloro-1,3-butadiene, 2-cyano-1,3-butadiene, the substituted straight-chain conjugated pentadienes, the straight and branched-chain hexadienes, and the like. Usually the conjugated dienes have from 4 to 10 carbon atoms, the 1,3-butadiene hydrocarbons, and 1,3-butadiene and isoprene specifically, because of their ability to produce particularly desirable polymeric material, are preferred.

The aqueous dispersions used in the practice of this invention are conveniently prepared from the above-described monomers by conventional emulsion polymerization at acid pH using small amounts of conventional emulsifiers and free-radical producing catalysts usually in an amount from about 0.01 percent to about 3 percent based on the weight of the monomers under conventional conditions of agitation, time, pressure, and temperature, using either a batchwise, incremental or continuous type addition of the monomers, water and other constituents to a reaction vessel or to a series of such vessels or by polymerization in a coil reactor.

The catalysts are of the type which produce free radicals and conveniently are per-oxygen compounds; for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free-radical producing materials such as 2,2'-azobisisobutyronitrile.

Emulsifiers are often advantageously included in the aqueous dispersion for stabilization of the dispersion and/or to provide particle size control. Usually at least one anionic emulsifier is included and one or more of the known nonionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well-known emulsifiers, for the purpose of illustration and not for limitation, are dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate. Other species of useful anionic emulsifying agents will be known. Typical nonionic emulsifiers (surfactants) are compounds formed by the reaction of an alkylene oxide, such as ethylene oxide, propylene oxide, or butylene oxide with long chain fatty alcohols, long chain fatty acids, alkylated phenols, and long chain alkyl mercaptans; the alkylene oxides being reacted in a ratio such as 5 moles to 20 moles or higher such as up to 50 moles per mole of the coreactant. Similarly effective compounds are monoesters such as the reaction products of a polyethylene glycol with long chain fatty acids, for example, glycerol monostearate, sorbitan trioleate, and partial and complete esters of long chain carboxylic acids with polyglycol ethers of polyhydric alcohols. By "long chain" in the above description usually is meant an aliphatic group having from six carbon atoms to 20 or more. Combinations of two or more emulsifying agents from one or more of the classes may be employed if desired for special effects.

The amount of emulsifier during polymerization usually is from about 0.05 part to about 5 parts preferably from about 0.5 part to about 3 parts, for each 100 parts of monomers on a weight basis.

Sometimes part or all of these surfactants are introduced into the polymerization mixtures as a component of a preformed seed latex. In such a process, to small amounts of a seed latex are added water, constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system being used, such temperatures usually being between about 0° C. and 115° C.

Conventional additives for latex compositions may be included in small but usual amounts and in a known manner. Such materials include, but are not restricted to, chain transfer agents, short stopping agents, buffers, antifoaming agents, chelating agents, inorganic salts, additional surfactants, plasticizers, tinting materials, bactericides, or other preservatives and the like.

The aqueous dispersions, i.e., the latex compositions, usually are prepared at a solids content of from about 30 percent to about 70 percent, preferably from about 40 percent to about 55 percent by weight.

The additive method also encompasses embodiments in which the carbocyclic compound is added to other constituents of the composition before or during emulsion polymerization of the monomers to form the latex.

The amount of the carbocyclic compound which is effective to provide water redispersibility usually is from about 1 part to about 10 parts, preferably from about 2 parts to about 8 parts, for each 100 parts of copolymer in the latex. Ordinarily the minimum proportion of carbocyclic compound would not be used with a latex containing the minimum amount of copolymerized carboxyl-containing monomer or with a latex having an average particle size near the smaller end of the particle-size range. The carbocyclic compound can be added either as the acid or as a water-soluble salt of the acid. However, when the pH of the latex is adjusted above 7 as described below, the carbocyclic compound will be, at least partially, in the water-soluble salt form.

The alternate in situ method of preparing compositions of this invention comprises the emulsion polymerization of the same kinds of monomers as noted above except that the aliphatic conjugated diene which is optional in the preparation of the preformed latex is a requirement in the situ method and there is also required fumaric acid or a water-soluble monoalkyl ester of an ethylenically unsaturated dicarboxylic acid having 4 to 5 carbon atoms. The monoalkyl esters are represented by the monomethyl, monoethyl and monopropyl esters of maleic acid, fumaric acid, itaconic acid and citaconic acid but the monomethyl esters are preferred and the especially preferred ester is monomethyl maleate. The amounts of the various components of the monomeric composition are from about 20 percent to about 97.5 percent, preferably from about 30 percent to about 60 percent, of the aliphatic conjugated diene, from about 2.5 percent to about 13 percent, preferably from about 4 percent to about 8 percent, of fumaric acid or of the monoalkyl ester, from 0 to about 77.5 percent, preferably from about 32 percent to about 66 percent of a nonionic monoethylenically unsaturated monomer and from 0 to about 8 percent of another $\alpha,\beta$-ethylenically unsaturated carboxylic acid, provided that the total amount of ethylenically unsaturated carboxyl-containing monomer is not greater than about 13 percent. The minimum amount of monoalkyl ester or fumaric acid ordinarily would be used only with the monomethyl esters, when another $\alpha,\beta$-ethylenically unsaturated carboxylic acid is also used or when polymerization conditions are chosen such that a large particle-size latex is produced. Similarly, when the monoethyl, and especially the monopropyl, esters are used, the amount should be selected from the upper part of the range.

In the in situ method the prescribed monomers are polymerized under conventional emulsion polymerization conditions at acid pH and optionally with conventional added materials as summarized above. However, best results are obtained when the polymerization is carried out in a sequential manner such that the fumaric acid or alkyl monoester is present in the initial composition before polymerization conditions are generated, together with not more than about 80 percent of the aqueous phase and optionally with a small amount of seed latex, then the other monomeric constituents and the remainder of the aqueous phase together with the catalyst are added as separate streams either incrementally or continuously until all of the constituents have been added.

During the emulsion polymerization process, some of the monoalkyl ester is copolymerized with the other monomeric constituents and some of it reacts with the conjugated diene and hydrolysis occurs to form a tetrahydrophthalic acid. Thus, there is obtained a latex of a carboxyl-containing polymer in admixture with a six-membered carbocyclic compound having two vicinal carboxyl substituents. It appears that when a half ester of itaconic acid is used, a rearrangement occurs such that some of the same kind of product is obtained, i.e., a carbocyclic compound having carboxyl groups attached directly to adjacent ring-carbon atoms.

While the latex products of this invention may be used for a wide variety of purposes, they are particularly desirable for use in the preparation of nonwoven products and for use in coatings.

The latex products may be converted to dry compositions (which are redispersible in water to reform latex products having about the same particle size as the original latex) in several ways. For example, the latex composition may be cast on a suitable surface such as glass and allowed to dry at ambient temperature or at higher temperatures but less than 95° C., preferably not exceeding 60° C. Powdery products can be obtained by spray-drying or freeze-drying techniques. However, for good redispersibility the latex composition should have a pH value from about 7 to about 14, preferably from about 8 to about 12. If the pH of the composition is lower than about 7, sufficient water-soluble base should be added, before drying, to raise the pH to the desired value. Any of the water-soluble organic or inorganic base-acting compounds may be used such as the lower molecular weight amines, for example, methyl amine, ethyl amine, n-propyl amine, n-butyl amine, n-amyl amine and 2-aminoethanol; and the ammonium or alkali metal hydroxides such as ammonium hydroxide, lithium hydroxide, sodium hydroxide and potassium hydroxide. To assure continued redispersibility the dried products should not be heated above about 95° C.

For the purpose of developing special characteristics, various other additives can be incorporated into the present compositions. Pigments or dyes can be introduced for the purpose of matching color of mortar to material being bonded. Surface active agents such as the aryl alkyl sulfonates and others can be added or introduced to give a smoother working mixture, reduce time of mixing, reduce number of operations in mixing, avoid lumps or agglomerates in the mix, reduce viscosity, or to provide better surface wetting, etc. Other specific properties can be gained by adding freeze-resistant agents, antibacterial agents, and the like.

The following examples, wherein all parts and percentages are by weight, are given to illustrate more clearly the principle and practice of this invention and are not for purposes of limitation.

EXAMPLE 1

A. Preparation of the Latex Plasticizer

Into a stirred, 3-liter glass pressure reactor was placed 55 parts of deionized water, 0.02 part of the trisodium salt of N-hydroxyethylene-diamine-triacetic acid, 0.10 part of the sodium salt of dodecyldiphenyl ether disulfonic acid, 5 percent of total monomer weight of monomethyl maleate and 1.65 parts of a seed latex containing 20 percent by weight of a copolymer having an average particle size of 200 Angstroms consisting of 50 percent of styrene and 50 percent of methyl methacrylate and also containing 15 percent (based on the weight of the copolymer) of sodium lauryl sulfate. The contents of the reactor are heated to 90° C. and were maintained at that temperature during the process. A first, separately prepared, aqueous solution of 0.02 part of N-hydroxyethyl-ethylenediamine triacetic acid, 0.5 part of the sodium salt of dodecyldiphenyl ether disulfonic acid, 0.2 part of sodium hydroxide and 0.5 part of sodium persulfate in 45 parts of deionized water was added in a continuous manner over a period of 4½ hours. Starting at the same time as the first aqueous continuous stream there was added in a continuous manner over a period of hours a monomer stream containing 56 percent by weight of monomeric styrene and 39 percent of monomeric butadiene and 1 part of bromoform. The reaction mixture was stirred for an additional three hours at 90° C. after the last of the components were added. A stable latex product was obtained thereby having an acid pH and a particle size of 2160 Angstroms.

Sodium hydroxide was added to a portion of the latex product to raise the pH above 8. Such material was then spray dried to obtain a dry powder. An equivalent amount of water was added to the dried material with moderate stirring to obtain a latex having 50 percent solids. The particle size for such reconstituted latex is found to be about 2250 Angstroms.

The presence of 1,2,3,6-tetrahydrophthalic acid in such material is confirmed by nuclear magnetic resonance. In this analysis, a portion of the latex is diluted with water to 20 percent solids. The diluted latex is certrifuged and the serum obtained therefrom is filtered through a Millipore filter, Model XX 424700, membrane No. PSWP 04710, (Millipore Corporation, Bedford, Mass.) to remove materials having a molecular weight greater than about 1000. A 10-milliliter portion of the filtrate thus obtained is dried under flowing nitrogen at room temperature and the dried residue is redissolved in 1 milliliter of deuterium oxide which contains 3 percent of an internal chemical shift reference (sodium 3-trimethylsilyl-propionate-2,2,3,3-$d_4$) and the nuclear magnetic resonance spectra at 60 megahertz and 260 megahertz is recorded. A small amount of a compound known to be 1,2,3,6-tetrahydrophthalic acid is added, the nuclear magnetic resonance spectra is again recorded and super-position of the pertinent absorption peaks is seen at a higher amplitude but no new distinct absorption peaks are evident.

B. Preparation of the Binder Composition

To 51.9 grams of Portland cement was added, with mixing, 6 grams of dried latex solids along with 0.5 part, based on latex solids, of a sodium-aluminum silicate anti-caking agent; 20 grams of an epoxy resin (diglycidyl ether of a polyhydric alcohol having an equivalent weight of from about 232 to 250 containing 20 parts of the plasticizer, dibutyl phthalate); and 8.2 grams of an ethylene diamine carbamate curing agent for said resin. To this mixture was then added 12 grams of calcium hydroxide, followed by the addition of 28 grams of deionized water.

C. Testing of the Binder Composition

The above binder composition was applied to individual concrete substrates which were cut from patio blocks having dimensions of 1⅝" x 7⅝" x 15⅞" to produce minibeam test specimens. These test specimens were bonded end to end and tested on an Instron Tester for flexural strength by center point loading. Tensile strength was determined on wedges cut from similar concrete substrates with the small end of the wedges (1⅝" x 1⅝") bonded together and tested for tensile adhesion. The uncured binder composition was satisfactorily washed off from the equipment used to prepare the test specimens. The test specimens were then allowed to cure at 73° F. and 50 percent relative humidity. The following Table I provides testing results:

TABLE I

| Sample No. | Days of cure | Additional days immersed in water | Tensile wedge (p.s.i.) Dry | Tensile wedge (p.s.i.) Wet |
|---|---|---|---|---|
| 1 | 9 | | 89 | |
| 2 | 9 | | 59 | |
| 3 | 6 | 3 | | 210 |
| 4 | 6 | 3 | | 180 |
| 5 | 6 | 3 | | 104 |

EXAMPLE 2

A latex was prepared as in Example 1 utilizing 50 percent monomeric styrene, 45 percent monomeric butadiene and 5 percent monomeric monomethyl maleate.

A binder composition was then prepared by forming a first mixture comprised of 519 grams of Portland cement; 45 grams of the dried latex solids along with 0.5 part, based on latex solids, of a sodium-aluminum silicate anti-caking agent; and 79 grams of a polyamide curing agent (having an amine value of 290–320). A second mixture was then prepared comprising 118 grams of the epoxy resin (as described in Example 1) along with 241.5 grams of deionized water. The second mixture was then slowly added to the first mixture with stirring. The rate and ease of mixing was equivalent to that achieved using the procedure of Example 1. The adhesive was loaded in a caulking gun and test specimens were made by applying two parallel ⁵⁄₁₆" beads to the ends of cement blocks. The uncured adhesive was easily removed with water from the surface of the caulking gun. Beams were made of these blocks by bonding them end to end and allowing them to cure at 73° F. and 50 percent relative humidity. The beams were tested on a Weaver Flex Test Machine for ultimate stress in binding by 2 point loading, points 3" on each side of the beam center (Span=30").

The beams were tested with the block cores and adhesive beads perpendicular to the direction of force application.

$$\text{Stress} = \frac{M}{S} \text{ where } M = \frac{P}{2} \cdot \frac{L-6}{2} \text{ and}$$

$$S = \frac{b(d^3 - d_1^3)}{6d}$$

where $p$=total applied load; $L$=test span; $b$=width of span; $d$=thickness of beam; $d_1$=beam thickness—2 × shell thickness. The following Table II sets forth the testing results.

TABLE II

| Sample No. | Days cure | Additional days immersed in water | Load (lbs.) | Stress (p.s.i.) |
|---|---|---|---|---|
| 6 | 3 | | 3,815 | 444 |
| 7 | 3 | | 3,885 | 452 |
| 8 | 3 | | 3,780 | 440 |
| 9 | 3 | 4 | 3,710 | 431 |
| 10 | 4 | 3 | 2,975 | 346 |
| 11 | 4 | 3 | 3,150 | 366 |
| 12 | 4 | 3 | 3,010 | 350 |

All of the above samples failed in the block rather than in the adhesive bond.

This example illustrates a means of forming the prescribed binder compositions wherein the ingredients may be premixed and supplied to the user as a two-package system without detriment to binder effectiveness.

EXAMPLE 3

A latex was prepared as in Example 1 utilizing 35 percent monomeric styrene, 56 percent monomeric butadiene, 4 parts acrylonitrile and 5 percent monomeric monomethyl maleate.

A binder composition was then prepared by forming a first mixture comprised of 51.9 grams of Portland cement; 4.75 grams of the dried latex solids along with 0.5 part, based on latex solids, of a sodium-aluminum silicate anti-caking agent; and 11.8 grams of the epoxy resin, as described in Example 1. A second mixture was then prepared comprising 7.9 grams of the resin curing agent of Example 2 along with 24.1 grams of deionized water. The second mixture was then slowly added to the first mixture with stirring. The rate and ease of mixing was equivalent to that achieved using the procedure of Example 1.

Tensile wedge and minibeam test specimens were fabricated and tested as set forth in Example 2. The uncured adhesive was satisfactorily washed off the equipment used to prepare such specimens with water. The following Table III provides testing results:

TABLE III

| Sample No. | Days cure | Additional days immersed in water | Mini-beam (p.s.i.) | Tensile wedge (p.s.i.) |
|---|---|---|---|---|
| 13 | 3 | | 566 | 295 |
| 14 | 3 | | 462 | 271 |
| 15 | 3 | | 451 | 205 |
| 16 | 20 | 3 | 451 | 199 |
| 17 | 20 | 3 | 419 | 223 |
| 18 | 20 | 3 | 325 | 191 |

All of the above samples failed in the cement block and not in the adhesive bond.

This example also illustrates a means of forming the prescribed binder compositions wherein the ingredients may be premixed and supplied to the user as a two-package system without detriment to binder effectiveness.

What is claimed is:

1. A plastic, aqueous binder composition consisting essentially of a mixture of the following in parts by weight of solids; from about 20 to about 85 hydraulic cement, from about 10 to about 50 liquid synthetic thermosetting ambient temperature curable 1,2-epoxide resin and an ambient temperature curing agent therefor, and from about 2 to about 25 of a polymeric latex plasticizer for said composition consisting essentially of an aqueous dispersion of particles of a copolymer of from about 1 percent to about 10 percent of an $\alpha,\beta$-ethylenically unsaturated carboxylic acid containing from 3 to 6 carbon atoms and the balance of a polymerizable, essentially water-insoluble, ethylenically unsaturated monomeric composition and an effective amount to provide water redispersibility of a six-membered carbocyclic compound having two vicinal carboxyl substituents; said copolymer being film forming at temperatures below about 95° C.

2. The composition of Claim 1 wherein said curing agent is a polyamine.

3. The composition of Claim 2 wherein the $\alpha,\beta$-ethylenically unsaturated carboxylic acid of said latex plasticizer consists essentially of about 5 percent of the copolymer.

4. The composition of Claim 3 wherein the copolymer of said latex contains from about 20 percent to about 97.5 percent of a polymerized aliphatic conjugated diene.

5. The composition of Claim 4 wherein the copolymer of said latex contains a polymerized alkenyl carbocyclic aromatic compound.

6. The composition of Claim 5 wherein said alkenyl carbocyclic aromatic compound is styrene.

7. The composition of Claim 6 wherein said copolymer contains from about 30 percent to about 60 percent of an aliphatic conjugated diene and about 65 to 35 percent styrene.

8. The composition of Claim 1 in which the copolymer of said latex is present as particles having an average diameter of from about 1500 Angstroms to about 4000 Angstroms.

9. The composition of Claim 1 in which the amount of carbocyclic compound is from about 2 parts to about 8 parts for each 100 parts of copolymer.

10. The composition of Claim 1 wherein the carbocyclic compound of said latex is a phthalic acid.

11. The composition of Claim 1 in which the carbocyclic compound of said latex is a 1,2,3,6-tetrahydrophthalic acid.

12. In the process of forming a plastic aqueous binder composition consisting essentially of a mixture of the following in parts by weight of solids; from about 20 to about 85 hydraulic cement, from about 10 to about 50 of a liquid synthetic thermosetting ambient temperature curable 1,2-epoxide resin and an ambient temperature curing agent therefor, and from about 2 to about 25 of a polymeric latex plasticizer for said composition, the improvement consisting of utilizing as said polymeric latex plasticizer an aqueous dispersion of particles of a copolymer of from about 1 percent to about 10 percent of an $\alpha,\beta$-ethylenically unsaturated carboxylic acid containing from 3 to 6 carbon atoms and the balance of a polymerizable, essentially water-insoluble, ethylenically unsaturated monomeric composition and an effective amount to provide water redispersibility of a six-membered carbocyclic compound having two vicinal carboxyl substituents; said copolymer being film forming at temperatures below about 95° C.

13. The process of Claim 12 comprising (1) separately preparing a mixture consisting essentially of a blend of said cement, resin and the dried solids of said polymeric latex plasticizer and thereafter adding to said mixture said curing agent and water.

14. The process of Claim 12 comprising (1) separately preparing a mixture consisting essentially of a blend of said cement, curing agent and the dried solids of said polymer latex plasticizer and thereafter adding to said mixture said resin and water.

References Cited

UNITED STATES PATENTS

| 3,228,907 | 1/1966 | Eash | 260—29.6 S |
| 3,240,736 | 3/1966 | Beckwith | 260—29.6 S |

HAROLD D. ANDERSON, Primary Examiner

U.S. Cl. X.R.

52—419, 596; 161—184, 255; 260—29.7 S